(12) United States Patent
Budden et al.

(10) Patent No.: US 8,129,293 B2
(45) Date of Patent: Mar. 6, 2012

(54) IMPREGNATED FLEXIBLE SHEET MATERIAL

(75) Inventors: Graham Budden, Cowbridge (GB); John Francis, Neath (GB)

(73) Assignee: Dow Corning Corporation, Midland, MI (US)

( * ) Notice: Subject to any disclaimer, the term of this patent is extended or adjusted under 35 U.S.C. 154(b) by 207 days.

(21) Appl. No.: 12/281,832

(22) PCT Filed: Feb. 21, 2007

(86) PCT No.: PCT/GB2007/050075
§ 371 (c)(1), (2), (4) Date: Feb. 24, 2009

(87) PCT Pub. No.: WO2007/102020
PCT Pub. Date: Sep. 13, 2007

(65) Prior Publication Data
US 2009/0305589 A1    Dec. 10, 2009

(30) Foreign Application Priority Data
Mar. 8, 2006    (GB) .................................. 0604583.5

(51) Int. Cl.
*B32B 27/04* (2006.01)
(52) U.S. Cl. .......................... 442/140; 442/135; 442/157
(58) Field of Classification Search .............. 442/134, 442/135, 140, 157, 59
See application file for complete search history.

(56) References Cited

U.S. PATENT DOCUMENTS

| | | |
|---|---|---|
| 2,431,878 A | 12/1947 | McGregor et al. |
| 3,839,388 A | 10/1974 | Nitzsche et al. |
| 4,564,693 A | 1/1986 | Riederer |
| 4,665,557 A | 5/1987 | Kamp |
| 4,668,557 A | 5/1987 | Lakes |
| 4,701,490 A | 10/1987 | Burkhardt et al. |
| 5,310,563 A | 5/1994 | Curtis et al. |
| 2004/0171321 A1 | 9/2004 | Plant |

FOREIGN PATENT DOCUMENTS

| | | |
|---|---|---|
| CN | 1345464 A | 4/2002 |
| EP | 0215470 A2 | 3/1987 |
| EP | 1254192 B1 | 8/2004 |
| GB | 890007 | 2/1962 |
| GB | 1387040 | 3/1975 |
| GB | 2252975 A | 8/1992 |
| JP | 4257439 A | 9/1992 |
| JP | 4257440 A | 9/1992 |
| WO | WO 9101210 A1 | 2/1991 |
| WO | 0044036 A1 | 7/2000 |
| WO | WO 0053830 A1 | 9/2000 |
| WO | WO 0149774 A2 | 7/2001 |
| WO | WO 03022085 A2 | 3/2003 |
| WO | WO 2004088015 A1 | 10/2004 |

OTHER PUBLICATIONS

English language abstract for EP 0215470 extracted from Delphion.com database, dated Jul. 22, 2008.
English language abstract for JP 4257440 extracted from espacenet.com database, dated Feb. 27, 2009.
English language abstract for JP 4257439 extracted from espacenet.com database, dated Aug. 26, 2008.
PCT International Search Report for PCT/GB2007/050075 dated Jun. 6, 2007, 3 pages.

*Primary Examiner* — Arti Singh-Pandey
(74) *Attorney, Agent, or Firm* — Howard & Howard Attorneys PLLC

(57) ABSTRACT

A flexible sheet material useful as an energy absorbing material is impregnated with a dilatant silicone composition comprising the reaction product of a polydiorganosiloxane and a boron compound selected from boric oxide, a boric acid, a boric acid precursor, a borate or a partially hydrolysed borate. The silicone composition can be modified by reaction with a hydrophobic compound reactive with silanol groups to improve the resistance to washing. The flexible sheet can be a material, e.g. a fabric, having a negative Poisson's ratio.

21 Claims, No Drawings

IMPREGNATED FLEXIBLE SHEET MATERIAL

RELATED APPLICATIONS

This application claims priority to and all the advantages of International Patent Application No. PCT/GB2007/050075, filed on Feb. 21, 2007, which claims priority to Great Britain Patent Application No. GB 0604583.5, filed on Mar. 8, 2006.

This invention relates to an impregnated flexible sheet material, for example a fabric, and to a process for impregnating a flexible sheet material. In particular it relates to a flexible sheet material impregnated with a dilatant silicone composition useful as an energy absorbing material.

WO-A-03/022085 describes a flexible energy absorbing material in which a dilatant material is impregnated into a flexible carrier such as a fabric or foam. The dilatant material remains soft until it is subjected to an impact, when its characteristics change rendering it temporarily rigid. The dilatant material returns to its normal flexible state after the impact. The preferred dilatant material is a silicone composition available from Dow Corning under the Trade Mark 'Dow Corning 3179'. The flexible energy absorbing material can be worn as impact protection, for example as clothing for motorcycling or skiing or as knee or elbow pads for roller skating or skateboarding.

JP-A-4-257439 and JP-A-4-257440 each describe a woven or unwoven cloth coated with or impregnated with heat-resistant paint consisting of polyborosiloxane, a silicone resin, an inorganic filling material and a short-fibrous inorganic filling material or glass frit.

GB-A-890007, U.S. Pat. No. 2,431,878 and GB-A-1387040 each describe a dilatant silicone composition, sometimes known as 'bouncing putty'.

When the flexible energy absorbing material is to be worn as impact protecting clothing, there may be a need for the clothing to be washable.

The present invention provides a flexible energy absorbing material which is a flexible sheet material impregnated with a dilatant silicone composition and which has improved resistance to washing.

According to one aspect of the invention, a flexible sheet material impregnated with a dilatant silicone composition comprising the reaction product of a polydiorganosiloxane and a boron compound, selected from boric oxide, a boric acid or boric acid precursor, a borate or a partially hydrolysed borate, is characterised in that the silicone composition is modified by reaction with a hydrophobic compound reactive with silanol groups. The hydrophobic compound reacts with residual silanol groups in the dilatant silicone to improve the water resistance of the impregnated sheet material.

According to another aspect of the invention, a flexible sheet material impregnated with a dilatant silicone composition comprising the reaction product of a polydiorganosiloxane and a boron compound, selected from boric oxide, a boric acid or boric acid precursor, a borate or a partially hydrolysed borate, is characterised in that the flexible sheet material has a negative effective Poisson's ratio.

In one process according to the invention for impregnating a flexible sheet material with a dilatant silicone composition comprising the reaction product of a polydiorganosiloxane and a boron compound selected from boric oxide, a boric acid, a boric acid precursor, a borate or a partially hydrolysed borate, the silicone composition is modified by reaction with a hydrophobic compound reactive with silanol groups.

In another process according to the invention for impregnating a flexible sheet material with a dilatant silicone composition comprising the reaction product of a polydiorganosiloxane and a boron compound selected from boric oxide, a boric acid, a boric acid precursor, a borate or a partially hydrolysed borate, the flexible sheet material has a negative Poisson's ratio.

The polydiorganosiloxane which is reacted with the boron compound is preferably a polydimethylsiloxane (PDMS) and can be a hydroxy-endblocked polydimethylsiloxane ranging from a disiloxane to a "high" polymer gum having a viscosity of at least 1000000 mPa·s at 25° C., optionally used together with a cyclic polydimethylsiloxane. Some trimethylsiloxane, monomethylsiloxane and $SiO_2$ units can be present but only in such proportions that the ratio of methyl radicals to silicon atoms is about 2, e.g. from 1.95 to 2.05.

The boron compound can be boric oxide, sometimes referred to as boric anhydride, boric acids such as orthoboric acid, metaboric acid and tetraboric acid, a boric acid precursor, for example a compound which hydrolyses to boric acid such as trimethoxy boroxine, and borates such as triethyl borate, tricyclohexyl borate, tritolyl borate, tribenzyl borate, triphenyl borate, triphenyl borate, triallyl borate, tridodecyl borate, trictadecyl borate, tri-tertiary butyl borate, phenyl ethylene borate, cyclohexyl ethylene borate, cyclohexyl ophenylene borate, glycerol borate, tris-trimethylsilyl borate, diammonium tetraborate, ammonium pentaborate, diammonium octaborate, sodium tetraborate decahydrate (borax), potassium pentaborate magnesium diborate, calcium monoborate, barium triborate and zinc metaborate. The borates can be simple borates or partially hydrolysed borates.

The dilatant silicone composition can be formed by heating a mixture of the polydiorganosiloxane and the boron compound, for example at temperatures of up to 250° C., for various periods of time, if necessary with milling to break up any gels formed. The preferred method is merely heating 100 parts by weight of a hydroxyl-endblocked dimethylpolysiloxane containing from 20 to 175 silicon atoms per molecule, preferably from 40 to 100 silicon atoms per molecule, with 2 to 6 parts of boric oxide at a temperature between 150° C. and 200° C. The dilatant silicone produced contains residual hydroxyl (silanol) groups.

The reaction product of the polydiorganosiloxane and the boron compound is made up, almost entirely, of dimethylpolysiloxane chains which average from 20 to 175 silicon atoms and which are silanol-end-blocked or joined together by —OBO— linkages or both. Some of the boron valencies can be satisfied by hydroxyl radicals, ester groups, salt groups, i.e. —OM wherein M is a metal atom, or other boron atoms through =BOB= linkages rather than by a siloxane group.

The hydrophobic compound should be reactive with silanol groups and is preferably reactive to form an end-blocking group on the siloxane rather than to further polymerise or crosslink the siloxane, so that the impregnated fabric or other flexible sheet material is not substantially stiffened.

One preferred class of hydrophobic compound is a compound of a transition metal selected from titanium, zirconium and hafnium. Preferred titanium compounds are titanium alkoxides, otherwise known as titanate esters. Zirconium alkoxides (zirconate esters) or hafnium alkoxides can alternatively be used. Titanate and/or zirconate based hydrophobic compounds may for example have the general formula $Ti[OR]_4$ and $Zr[OR]_4$ respectively where each R may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R include but are not restricted to methyl, ethyl, propyl, isopropyl, butyl, tertiary butyl and a branched secondary alkyl group such as 2,4-dimethyl-3-pentyl. Preferably, when each R is the same, R is an isopropyl, branched secondary alkyl group or a tertiary alkyl group, in particular, tertiary butyl. Examples of titanate esters include tetraisopropyl titanate, tetrabutyl titanate and tetraisobutyl titanate. Silicate esters can alternatively be used, such as tetraethyl orthosilicate or tetrabutyl orthosilicate.

The titanate may be chelated. The chelation may be with any suitable chelating agent such as an alkyl acetylacetonate such as methyl or ethylacetylacetonate. Any suitable chelated titanates or zirconates may be utilised. Preferably the chelate group used is a monoketoester such as acetylacetonate and alkylacetoacetonate giving chelated titanates such as diisopropyl bis(acetylacetonyl)titanate, diisopropyl bis(ethylacetoacetonyl)titanate or diisopropoxytitanium bis(ethylacetoacetate). Further examples of titanium or zirconium compounds that can be used as the hydrophobic compound in this invention are those described as catalysts in EP-A-1254192 and WO-A-01/49774 which are incorporated herein by reference.

A titanate ester, or other hydrophobic compound of titanium, zirconium or hafnium can for example be used at 0.1 to 50% by weight based on the dilatant silicone, particularly at least 0.5% and up to 20% based on the dilatant silicone.

Another suitable class of hydrophobic compound is organosiloxanes and organosilanes having groups, particularly substituted organic groups, reactive with silanol groups. Examples of such substituted organic groups are amino-substituted organic groups such as aminoalkyl groups, for example 3-aminopropyl, 3-amino-2-methylpropyl, 3-(2-aminoethylamino)-2-methylpropyl or 3-(2-aminoethylamino)propyl, carboxyl-substituted organic groups or epoxy-substituted organic groups. Polyorganosiloxanes can for example have such substituted organic groups as terminal or pendant groups. A reactive organosiloxane such as an aminoalkyl-containing polydiorganosiloxane can for example be used at 0.2 to 50% by weight based on the dilatant silicone, particularly at least 1% and up to 20% based on the dilatant silicone.

It may be advantageous to use such a reactive organosiloxane or organosilane in conjunction with a titanate ester, since in addition to reacting with silanol groups the titanate ester catalyses the reaction of other groups with silanol groups. Combinations of titanate ester and aminoalkyl-containing polydiorganosiloxane have been found effective, for example 0.5 to 20% by weight of aminoalkyl-containing polydiorganosiloxane with 0.1 to 10% by weight titanate ester based on the dilatant silicone.

Silicon compounds such as silanes and siloxanes having a Si-bonded alkoxy group are also reactive with silanol groups, although Si-bonded groups are more likely than substituted organic groups to cause polymerisation or crosslinking of the dilatant siloxane. A reactive hydrophobic silane can for example be an alkylalkoxysilane such as a trialkylalkoxysilane, for example trimethylmethoxysilane or dimethyloctylmethoxysilane, or an alkyltrialkoxysilane, for example methyltrimethoxysilane, isobutyltrimethoxysilane or octyltrimethoxysilane. Alkylalkoxysilanes including a Si-bonded alkyl group having at least 4 carbon atoms, for example an octyl, isobutyl, hexyl or 2-ethylhexyl group, may be particularly effective in modifying the silicone composition to improve the wash resistance of the impregnated flexible sheet material. Other silicon compounds reactive with silanol groups include silazanes such as hexamethyldisilazane and chlorosilanes.

The hydrophobic compound reactive with silanol groups can for example be a non-linear siloxane resin consisting of siloxane units of the average formula $R'_a SiO_{4-a/2}$ wherein R' denotes a hydroxyl, hydrocarbon (for example alkyl, alkenyl, substituted alkyl, cycloalkyl, aryl or aralkyl) or hydrocarbonoxy group, and wherein a has an average value of from 0.5 to 2.4, preferably 1.0 to 2.0. The non-linear siloxane resin can comprise branching units selected from $R'SiO_{3/2}$ (also known as T units) and $SiO_{4/2}$ units (also known as Q units). T units can be present alone or together with $R'_3SiO_{1/2}$ units (also known as M units) and optionally $R'_2SiO_{2/2}$ units (also known as D units). Resins containing Q units generally contain M units and optionally D units. Such non-linear siloxane resins generally contain silanol groups and/or residual Si-bonded alkoxy groups as a consequence of the reaction used to make them. For example resins containing T units (T resins) are generally prepared by hydrolysis and condensation of an alkyl trialkoxy silane, optionally with a trialkyl alkoxy silane to incorporate M units (MT resins), in the presence of an acid or base catalyst. The resin can alternatively be a MQ resin.

We have found that non-linear siloxane resins including a Si-bonded alkyl group having at least 4 carbon atoms, for example a hexyl, octyl or 2-ethylhexyl group, are particularly effective in modifying the silicone composition to improve the wash resistance of the impregnated flexible sheet material. A T resin or MT resin can for example be derived from octyltrimethoxysilane, or a MT or MQ resin can be derived from dimethyloctylmethoxysilane.

A non-linear siloxane resin can for example be used at 1 to 50% by weight based on the dilatant silicone, particularly at least 2% and up to 20% based on the dilatant silicone.

The non-linear siloxane resin can advantageously be used in conjunction with a titanate ester. In addition to reacting with silanol groups in the dilatant silicone, the titanate ester reacts with silanol groups in the branched siloxane resin and catalyses the reaction of silanol groups or Si-bonded alkoxy groups in the branched siloxane resin with silanol groups in the dilatant silicone, and also catalyses self-condensation of the branched siloxane resin. For example, 1 to 20% by weight of branched siloxane resin based on the dilatant silicone can be used in conjunction with 0.1 to 10% by weight titanate ester.

If the hydrophobic compound is a reactive organosiloxane or organosilane, a siloxane polycondensation catalyst may be utilised. These include protic acids, Lewis acids, organic and inorganic bases, metal salts, organometallic compounds and catalysts based on phosphonitrile chloride. Protic acid catalysts include sulphuric acid, hydrochloric acid or a sulphonic acid such as dodecylbenzenesulphonic acid. Suitable Lewis acid catalysts include, for example, boron trifluoride $FeCl_3$, $AlCl_3$, $ZnCl_2$ and $ZnBr_2$ Base catalysts include sodium hydroxide, carboxylates of rubidium or caesium, hydroxides of magnesium, calcium or strontium, tetramethylammonium hydroxide, tetrabutyl phosphonium silanolate and amines such as n-hexylamine or tetramethylguanidine. Metal salt and organometallic catalysts can for example incorporate tin, lead, antimony, iron, cadmium, barium, manganese, zinc, chromium, cobalt, nickel, aluminium, gallium or germanium. Examples include metal triflates, organic tin metal catalysts such as triethyltin tartrate, stannous octoate, tin oleate, tin naphthate, butyltintri-2-ethylhexoate, tinbutyrate, carbomethoxyphenyl tin trisuberate, isobutyltintriceroate, and diorganotin salts such as diorganotin dicarboxylate compounds such as dibutyltin dilaurate, dimethyltin dibutyrate, dibutyltin dimethoxide, dibutyltin diacetate, dimethyltin bis-neodecanoate, dibutyltin dibenzoate, dimethyltin dineodeconoate or dibutyltin dioctoate. Catalysts based on phosphonitrile chloride are for example those described in U.S. Pat. No. 3,839,388 and U.S. Pat. No. 4,564,693 or EP-A-215470 and phosphonitrile halide ion based catalysts, as described in GB2252975, and oxygen-containing chlorophosphazenes containing organosilicon radicals.

The hydrophobic compound can alternatively be an organic compound containing a group reactive with silanol groups, for example carboxylic acid groups or amino groups. The hydrophobic compound can for example be a long chain carboxylic acid having at least 12 carbon atoms such as stearic acid or oleic acid.

The flexible sheet material is preferably a fabric, for example a woven, knitted or nonwoven fabric. It can for example be a structured fabric having a thickness such as 2-10 mm of the type sold as a spacer textile. The fabric can for example be formed of polyester, polyamide, aromatic polyamide, cotton, wool, acrylic or cellulosic fibres. It may be constructed with an abrasion resistant fibre such as aromatic polyamide arranged to be at the outer surface of a protective garment with a comfort fibre such as cotton or a wicking microfibre at the inner surface.

The flexible sheet material can alternatively be a foam, preferably an open cell foam such as a polyurethane foam or cellulose foam.

According to one aspect of the invention, the flexible sheet material is an auxetic material, that is a material having a negative or effectively negative Poisson's ratio so that it expands perpendicular to an axis about which it is stretched. Auxetic materials are described for example in WO-A-2004/088015, WO-A-00/53830, U.S. Pat. No. 4,668,557 and WO-A-91/01210. The impact protection of a flexible sheet material impregnated with a dilatant can be enhanced by using an auxetic material as the flexible sheet material which is impregnated.

The auxetic material can for example be in fibrous or filamentary form, so that a woven, knitted or nonwoven fabric having auxetic properties can be produced in which all or some of the fibres forming the fabric are auxetic. The auxetic fibre can for example comprise a first component and second component extending longitudinally relative to an axis, the first component being provided around the second component through one or more turns, as described in WO-A-2004/088015. Variation in tensile load on the first component can cause the radial position of the second component relative to the axis to vary. The first component can have a higher modulus of elasticity than the second component, whereby variation in the tensile or compressive load on the first component causes the radial position of the second component relative to the axis to vary. The first component can be wrapped around the second component in a helical manner. Variation in the tensile or compressive load on the first component causing variation in the diameter of the helix the first component follows. The variation in the diameter of the helix of the first component causing the second component to take on the form of a helix and/or causes the diameter of the helix of the second component to vary. The diameter of the second component helix increases as the first component helix decreases in diameter and the diameter of the second component helix decreases as the first component helix increases in diameter.

The first component may be a fibre, rod or hollow tube, preferably of a relatively high modulus material. The first component may for example be formed of carbon fibre, glass fibre, aramid (e.g. Kevlar™), polyamide (e.g. nylon), polyesters, e.g. polyethyleneterephthalate (PET), polyolefin, metal wire, cotton or other material. The first component may be sealed with a cured film, for example a cured siloxane film. The second component may be a fibre, rod or hollow tube, preferably consisting of a lower modulus material. The material is preferably capable of deformation without fracture. The second component may for example be formed of siloxane, liquid silicone rubber, natural rubber, nitrile rubber or any other elastomeric material. The first component may have a diameter that is between 0.01 and 1 times the diameter of the second component.

Alternative auxetic filaments and fibres are described in WO-A-00/53830. Auxetic foams are described in U.S. Pat. No. 4,668,557.

The flexible sheet material is impregnated with the dilatant silicone composition, and the dilatant silicone composition is modified by reaction with a hydrophobic compound reactive with silanol groups. The dilatant silicone composition can be mixed with the hydrophobic compound before or after application to the flexible sheet material.

Thus in one process according to the invention the dilatant silicone composition is mixed with the hydrophobic compound and the flexible sheet material is impregnated with the resulting composition. The dilatant silicone composition generally needs to be diluted with an organic solvent to the optimum viscosity for application to a flexible sheet material, and the dilatant silicone composition can be mixed with the hydrophobic compound in the presence of an organic solvent. Examples of suitable solvents are alcohols such as isopropanol, butanol, isobutanol, n-propanol or pentanol, ether alcohols, esters such as butyl acetate or ester alcohols. The solvent can be a supercritical fluid, for example supercritical carbon dioxide. The concentration of dilatant silicone composition in such a solution can for example be 10 to 95% by weight, usually from 20 or 30% up to 80% by weight.

In an alternative process according to the invention the flexible sheet material is impregnated with the dilatant silicone composition and is then treated with the reactive hydrophobic compound. Most classes of reactive hydrophobic compound can be applied more readily and more controllably if diluted with an organic solvent, for example one of the organic solvents disclosed above. The concentration of reactive hydrophobic compound in the solution applied to the flexible sheet material can for example be in the range 5 to 90% by weight.

The dilatant silicone composition and the reactive hydrophobic compound, either separately or together, can be applied to the flexible sheet material by any of the processes known for impregnating flexible sheet materials such as fabrics. Examples are padding, dipping, spraying, application by rollers, curtain coating, knife coating or screen printing. Dipping of the fabric in a bath of the composition to be applied, followed by squeezing between rollers to control the amount of composition taken up by the fabric or other sheet material, is one suitable process. After impregnation the fabric or other sheet material is dried, either by allowing the fabric to dry under ambient conditions or by applying heat and/or a current of a drying gas such as air to accelerate drying. Drying can for example be carried out at 40 to 200° C., particularly 60 to 120° C. If the flexible sheet material is impregnated with the dilatant silicone composition and is then treated with the reactive hydrophobic compound, the flexible sheet material may be dried after impregnation with the dilatant silicone composition or the two composition can be applied successively without an intermediate drying step.

In another alternative process according to the invention, the flexible sheet material is impregnated with a mixture of a silanol-terminated polydiorganosiloxane, a boron compound selected from boric oxide, a boric acid, a borate or a partially hydrolysed borate, and a hydrophobic compound reactive with silanol groups, and the silanol-terminated polydiorganosiloxane, the hydrophobic compound and the boron compound are reacted on the flexible sheet material. The flexible sheet material can for example be heated to react the silanol-terminated polydiorganosiloxane with the boron compound. It can for example be heated at 50 to 200° C., particularly 60 to 120° C. The mixture of silanol-terminated polydiorganosiloxane and boron compound can be unreacted before impregnation or these reactants can be partially polymerised before impregnation.

If the hydrophobic compound reactive with silanol groups is a titanate ester such as a titanium tetraalkoxide, it can act as a catalyst for the polymerisation reaction of the silanol-terminated polydiorganosiloxane as well as reacting with terminal silanol groups, so that heating to react the silanol-terminated polydiorganosiloxane may not be necessary. However heating at the temperatures disclosed above may be preferred even when a titanate ester is present to achieve a rapid reaction forming the dilatant composition in situ in the flexible sheet material.

A foam impregnated with a dilatant composition can be produced by mixing the dilatant composition with foam-forming ingredients which are then allowed to foam. A hydrophobic compound reactive with silanol groups, for example a titanate ester, can be used to modify the dilatant composition in such a process.

Thus in a process according to another aspect of the invention for the preparation of a foam impregnated with a dilatant silicone composition comprising the reaction product of a polydiorganosiloxane and a boron compound selected from boric oxide, a boric acid or boric acid precursor, a borate or a partially hydrolysed borate, the dilatant composition is mixed with foam-forming ingredients which are then allowed to foam, characterised in that the dilatant silicone composition is modified by reaction with a hydrophobic compound reactive with silanol groups.

The foam-forming ingredients can be a plastic material mixed with a latent gas generating material but are preferably reagents which react to form a foam blown with gas generated during the reaction, for example polyurethane foam precursors such as an isocyanate or blocked isocyanate and an active hydrogen compound such as a polyol, particularly a polyether polyol and/or a polyester polyol.

The hydrophobic compound reactive with silanol groups can for example be mixed with the dilatant silicone composition before it is mixed with the foam-forming ingredients or can be mixed with the foam-forming ingredients simultaneously with the dilatant silicone composition. Alternatively a foam produced by mixing the dilatant composition with foam-forming ingredients can subsequently be treated with the hydrophobic compound.

The reactive hydrophobic compound improves the wash fastness of the treated flexible sheet material. When fabric impregnated with the untreated dilatant composition is washed, part of the dilatant is lost from the fabric and the fabric becomes very sticky and loses its dilatant character. When the reactive hydrophobic compound is applied, either together with the dilatant composition or as a subsequent step, the loss of dilatant from the fabric is markedly reduced so that the impregnated fabric can survive a sequence of 10 washes and usually of at least 20 washes, without the fabric becoming sticky or losing its dilatant character.

The reactive hydrophobic compound may increase the stiffness of the impregnated fabric. This can be counteracted by application of a plasticiser such as a substantially non-reactive polydiorganosiloxane fluid. The substantially non-reactive polydiorganosiloxane fluid can be a linear polydimethylsiloxane or other polydialkylsiloxane, for example a trimethylsilyl-terminated polydimethylsiloxane of viscosity 50 to 1000000 mPa·s at 25° C. or a dimethylhydroxysilyl-terminated polydimethylsiloxane of viscosity 2000 to 500000 mPa·s at 25° C. The plasticiser can for example be used at 1 to 50% by weight based on the dilatant silicone composition, particularly 2 to 20%.

The impregnated flexible sheet material according to the invention can be used in any of the constructions of energy absorbing material based on fabric or other flexible sheet material described in WO-A-03/022085. Impregnated fabrics according to the invention are particularly suitable for energy absorbing garments for potentially dangerous sports such as motorcycling, skiing, skating, skateboarding or snowboarding.

The invention is illustrated by the following Examples in which parts and percentages are by weight.

EXAMPLES 1 TO 5

60 parts of a dilatant composition formed from a silanol-terminated polydimethylsiloxane having a viscosity of 41 mPa·S at 25° C. (a silanol terminated PDMS) and boric acid were dissolved in 40 parts isopropanol to form a dilatant impregnating solution. Various amounts of tetraisopropyl titanate (TIPT), as set out in Table 1, were dissolved in the solution by mixing with a propeller mixer.

The dilatant compositions of Examples 1 to 5, and a comparative Example 1 in which no tetraisopropyl titanate was added to the dilatant composition, were applied to a 4.5 mm thick 600 g/m² spacer textile formed of polyester fibres and having a 2 mm AF diamond pattern, available from Scott & Fyfe of Fife, Scotland. This fabric is slightly auxetic. The fabric was impregnated by dipping it in a bath of the dilatant, followed by squeezing through rollers set to a 4 mm gap. The fabric was then dried in a forced draught oven at 80-100° C. for 20 minutes. The amount of dilatant composition applied to the fabric was about 1500 g/m2.

The impregnated fabric was subjected to a wash test of 10 washes. The washing machine used was a domestic machine Hotpoint First Edition 1000, model WM52, using the washing cycle: Wool cycle "J" at 40° C. and 18 liter water volume, with "Dreft" (Trade Mark) mild washing powder at 3.38 g/l and a 2 kg fabric load. After each wash, the washed fabric was dried at 80° C. for 2 hour in forced draft oven. The results are shown in Table 1.

EXAMPLES 6 AND 7

The composition of Example 4 was modified by the addition of plasticisers. In Example 6 the plasticizer was a silanol-terminated linear PDMS fluid of viscosity 20000 mPa·s at 25° C. In Example 7 the plasticizer was a trimethylsilyl-terminated linear PDMS fluid of viscosity 12500 mPa·s at 25° C. The fabric used in Examples 1 to 5 was impregnated with each of the compositions of Examples 6 and 7 and was wash tested. The results are shown in Table 1.

TABLE 1

| Example | % TIPT | Weight loss % after 10 washes |
|---|---|---|
| Comparative 1 | 0 | 33 |
| 1 | 0.5 | 15 |
| 2 | 1 | 14 |
| 3 | 3 | 6 |
| 4 | 5 | 2 |
| 5 | 8 | 2 |
| 6 | 5 + 5% 20,000 mPa · s silanol silanol-terminated linear PDMS fluid | 2 |
| 7 | 5 + 5% 12,500 mPa · s | 2 |

TABLE 1-continued

| Example | % TIPT | Weight loss % after 10 washes |
|---------|--------|-------------------------------|
|         | trimethylsilyl-terminated linear PDMS fluid | |

As well as reducing the weight loss on washing, the compositions of Examples 1 to 7 held the impact strength and stiffness of the impregnated fabric close to its value before washing, whereas the fabric of the comparative Example became soft and sticky after washing.

EXAMPLE 8

A fabric was impregnated with 60 parts of a dilatant composition formed from a silanol-terminated PDMS and boric acid dissolved in 40 parts isopropanol, as described in the comparative Example above. The dried impregnated fabric was then treated in the same apparatus with a solution of 23.8% of a diorganosiloxane containing dimethylsilicone units and methyl(3-aminopropyl)silicone units and 1.2% tetraisopropyl titanate in 75% isopropanol. The treated fabric was dried at 90° C. for 20 minutes.

EXAMPLE 9

Example 8 was repeated using a solution of 24.75% methyltrimethoxysilane and 1% tetraisopropyl titanate in isopropanol in place of the aminosilicone solution.

The treated fabrics produced in Examples 8 and 9 were subjected to wash tests carried out by an independent test institute to British Standard BS EN ISO 6330: 2003 Program 8A using 'Dreft' washing powder as described above. In this test 10 washes are carried out without drying between washes. The weight loss after 10 washes for the fabric of Example 8 was 3.6% and for the fabric of Example 9 was 15.7%.

EXAMPLES 10 TO 14

Example 1 was repeated using various combinations of dilatant silicone composition (DSC), isopropanol (IPA), tetraisopropyl titanate (TIPT) and amino-functional silicone (AFS), as used in Example 8, or methyltrimethoxysilane (MTM), as the impregnating solution. The fabrics produced were wash tested by the test institute to British Standard BS EN 6330 as described in Example 9. The results for weight loss after 10 washes are shown in Table 2 below

TABLE 2

| Example | Hydrophobic Agent parts w/w | wt loss % after 10× wash |
|---------|-----------------------------|--------------------------|
| 10 | 60 DSC/40 IPA/1.2 AFS/3 TIPT | 10.6 |
| 11 | 60 DSC/40 IPA/4.8 AFS/3 TIPT | 3.7 |
| 12 | 60 DSC/40 IPA/7.5 AFS/2.5 TIPT | 1.2 |
| 13 | 60 DSC/40 IPA/1.2 MTM/0.6 TIPT | 13.7 |
| 14 | 60 DSC/40 IPA/4.8 MTM/0.6 TIPT | 6.2 |

EXAMPLES 15 TO 19

Example 1 was repeated using various combinations of dilatant silicone composition (DSC), isopropanol (IPA) and amino-functional silicone (AFS), with or without tetraisopropyl titanate (TIPT), as the impregnating solution. The fabrics produced were wash tested by the procedure described in Example 1. The results for weight loss after 10 washes are shown in Table 3 below.

TABLE 3

| Example | Formulation | % weight loss after 10 washes |
|---------|-------------|-------------------------------|
| 15 | 60 DSC/40 IPA/3.2 AFS/3 TIPT | 13.2 |
| 16 | 60 DSC/40 IPA/4.8 AFS/3 TIPT | 18.6 |
| 17 | 60 DSC/40 IPA/4.8 AFS/0 TIPT | 24.2 |
| 18 | 60 DSC/40 IPA/4.8 AFS/0.6 TIPT | 26.6 |
| 19 | 60 DSC/40 IPA/4.8 AFS/1.8 TIPT | 22.2 |

EXAMPLES 20 TO 21

60 parts of a dilatant composition formed from a silanol-terminated PDMS and boric acid were dissolved in 40 parts isopropanol to form a dilatant impregnating solution. Various amounts of n-octyl branched silicone resin, as set out in Table 4, were dissolved in the solution by mixing with a propeller mixer and 0.5% TIPT was added to each composition.

The dilatant compositions of Examples 20 to 21, and a comparative Example 2 in which no silicone resin was added to the dilatant composition, were applied to the spacer textile of Example 1 using the process described in Example 1. Each impregnated fabric was subjected to a wash test as described in Example 1. The results are shown in Table 4.

TABLE 4

| Example | % Resin | Weight loss % after 10 washes |
|---------|---------|-------------------------------|
| Comparative 2 | 0 | 33 |
| 20 | 6 | 6 |
| 21 | 12 | 4 |

The invention claimed is:

1. A flexible sheet material impregnated with a dilatant silicone composition having residual silanol groups, comprising the reaction product of a polydiorganosiloxane and a boron compound selected from the group consisting of boric oxide, a boric acid, a boric acid precursor, a borate and a partially hydrolyzed borate, wherein the dilatant silicone composition is modified by reaction of the residual silanol groups with a hydrophobic compound reactive with silanol groups, in which the hydrophobic compound comprises a titanate ester.

2. An impregnated flexible sheet material according to claim 1, wherein the titanate ester is a titanium tetraalkoxide.

3. An impregnated flexible sheet material according to claim 1, wherein that the hydrophobic compound comprises a branched siloxane resin having groups reactive with silanol groups.

4. An impregnated flexible sheet material according to claim 3, wherein the branched siloxane resin includes a Si-bonded alkyl group having at least 4 carbon atoms.

5. An impregnated flexible sheet material according to claim 1, wherein the hydrophobic compound comprises an alkylalkoxysilane including a Si-bonded alkyl group having at least 4 carbon atoms.

6. An impregnated flexible sheet material according to claim 1, wherein the hydrophobic compound comprises a siloxane fluid having groups reactive with silanol groups.

7. An impregnated flexible sheet material according to claim 6, wherein the reactive siloxane fluid is an amino-functional siloxane fluid.

8. An impregnated flexible sheet material according to claim 1, wherein the flexible sheet material is a fabric.

9. An impregnated flexible sheet material according to claim 1, wherein the flexible sheet material is a foam.

10. An impregnated flexible sheet material according to claim 1, wherein the flexible sheet material has a negative Poisson's ratio.

11. An impregnated flexible sheet material according to claim 10, wherein the flexible sheet material comprises a first component and a second component, the first component and second component extending longitudinally relative to an axis, the first component being provided around the second component through one or more turns, the first component having a higher modulus of elasticity than the second component, variation in the tensile or compressive load on the first component causing the radial position of the second component relative to the axis to vary.

12. A flexible sheet material impregnated with a dilatant silicone composition having residual silanol groups comprising the reaction product of a polydiorganosiloxane and a boron compound selected from the group consisting of boric oxide, a boric acid, a boric acid precursor, a borate and a partially hydrolyzed borate, wherein the flexible sheet material has a negative Poisson's ratio: and wherein the dilatant silicone composition is modified by reaction of the residual silanol groups with a hydrophobic compound reactive with silanol groups and the hydrophobic compound comprises a titanate ester.

13. A process for impregnating a flexible sheet material with a dilatant silicone composition having residual silanol groups, comprising the reaction product of a polydiorganosiloxane and a boron compound selected from the group
consisting of boric oxide, a boric acid or boric acid precursor, a borate and a partially hydrolyzed borate, wherein the silicone composition is modified by reaction of the residual silanol groups with a hydrophobic compound reactive with silanol groups, and the hydrophobic compound comprises a titanate ester.

14. A process according to claim 13, wherein said reaction product is mixed with the hydrophobic compound in the presence of an organic solvent and the flexible sheet material is impregnated with the resulting composition.

15. A process according to claim 13, wherein the flexible sheet material is impregnated with the reaction product and is then treated with the hydrophobic compound.

16. A process according to claim 13, wherein the flexible sheet material is impregnated with a mixture of a silanol-terminated polydiorganosiloxane, a boron compound selected from the group consisting of boric oxide, a boric acid, a borate and a partially hydrolyzed borate, and a hydrophobic compound reactive with silanol groups, and the silanol-terminated polydiorganosiloxane, the hydrophobic compound and the boron compound are reacted on the flexible sheet material.

17. A process according to claim 16, wherein the flexible sheet material is heated to react the silanol-terminated polydiorganosiloxane with the boron compound.

18. A process according to claim 16, wherein the hydrophobic compound is a titanium tetraalkoxide and acts as a catalyst for the reaction of the silanol-terminated polydiorganosiloxane with the boron compound as well as reacting with the terminal silanol groups.

19. A process according to claim 13, wherein the flexible sheet material is a fabric.

20. A process for impregnating a flexible sheet material with a dilatant silicone composition having residual silanol groups comprising the reaction product of a polydiorganosiloxane and a boron compound selected from the group consisting of boric oxide, a boric acid or boric acid precursor, a borate and a partially hydrolyzed borate, wherein the flexible sheet material has a negative Poisson's ratio, and wherein the dilatant silicone composition is modified by reaction of the residual silanol groups with a hydrophobic compound reactive with silanol groups and the hydrophobic compound comprises a titanate ester.

21. A process for the preparation of a foam impregnated with a dilatant silicone composition having residual silanol groups comprising the reaction
product of a polydiorganosiloxane and a boron compound selected from the group consisting of boric oxide, a boric acid or boric acid precursor, a borate and a partially hydrolyzed borate in which the dilatant composition is mixed with foam-forming ingredients which are then allowed to foam, wherein the dilatant silicone composition is modified by reaction with a hydrophobic compound reactive with silanol groups and the hydrophobic compound comprises a titanate ester.

* * * * *